Nov. 18, 1930.    B. F. UHL    1,782,054
METHOD AND APPARATUS FOR PROCESSING MATERIALS BY MEANS OF GASES
Filed Sept. 1, 1927    4 Sheets-Sheet 4
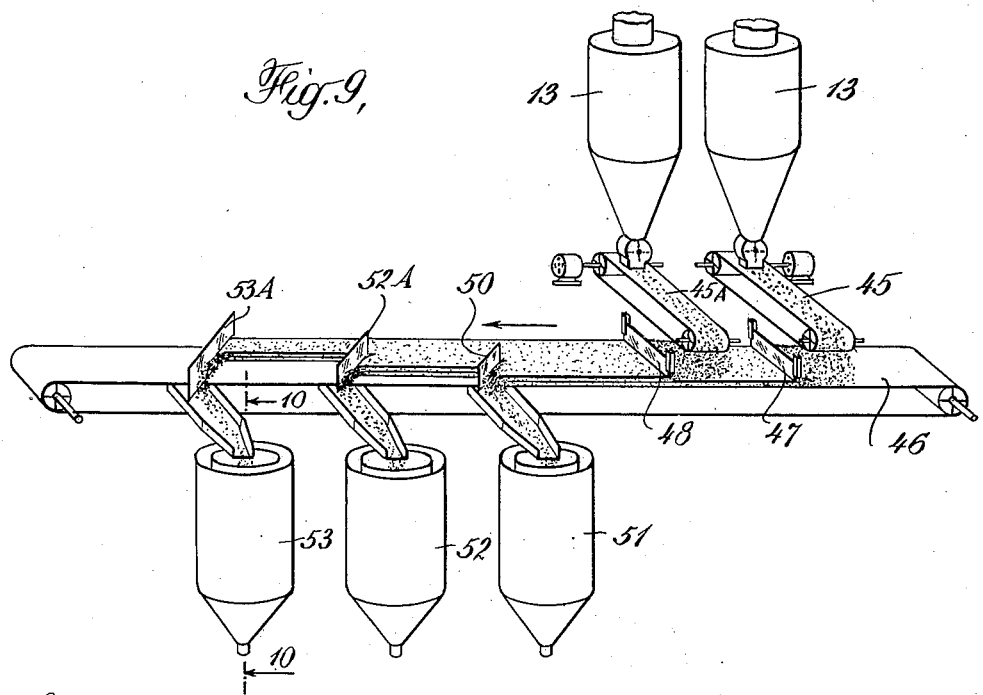
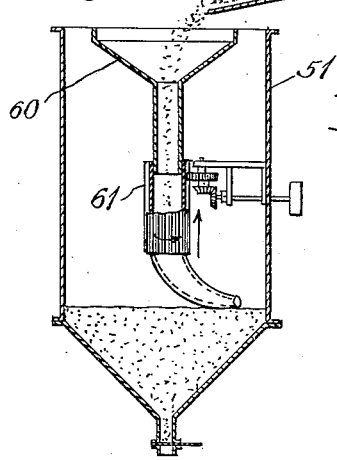
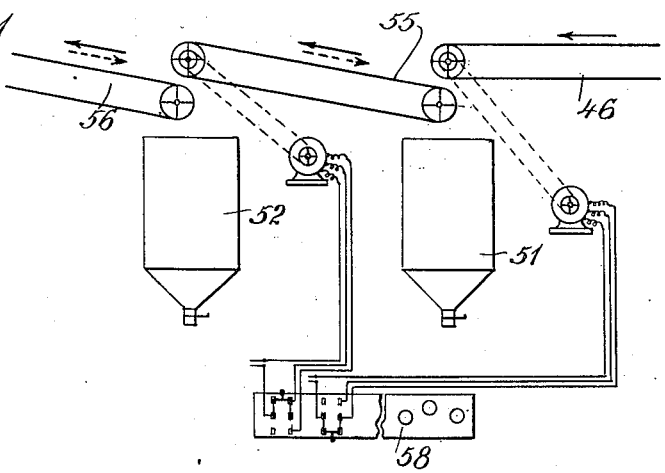
INVENTOR
Ben Forrest Uhl
BY
ATTORNEY Patented Nov. 18, 1930

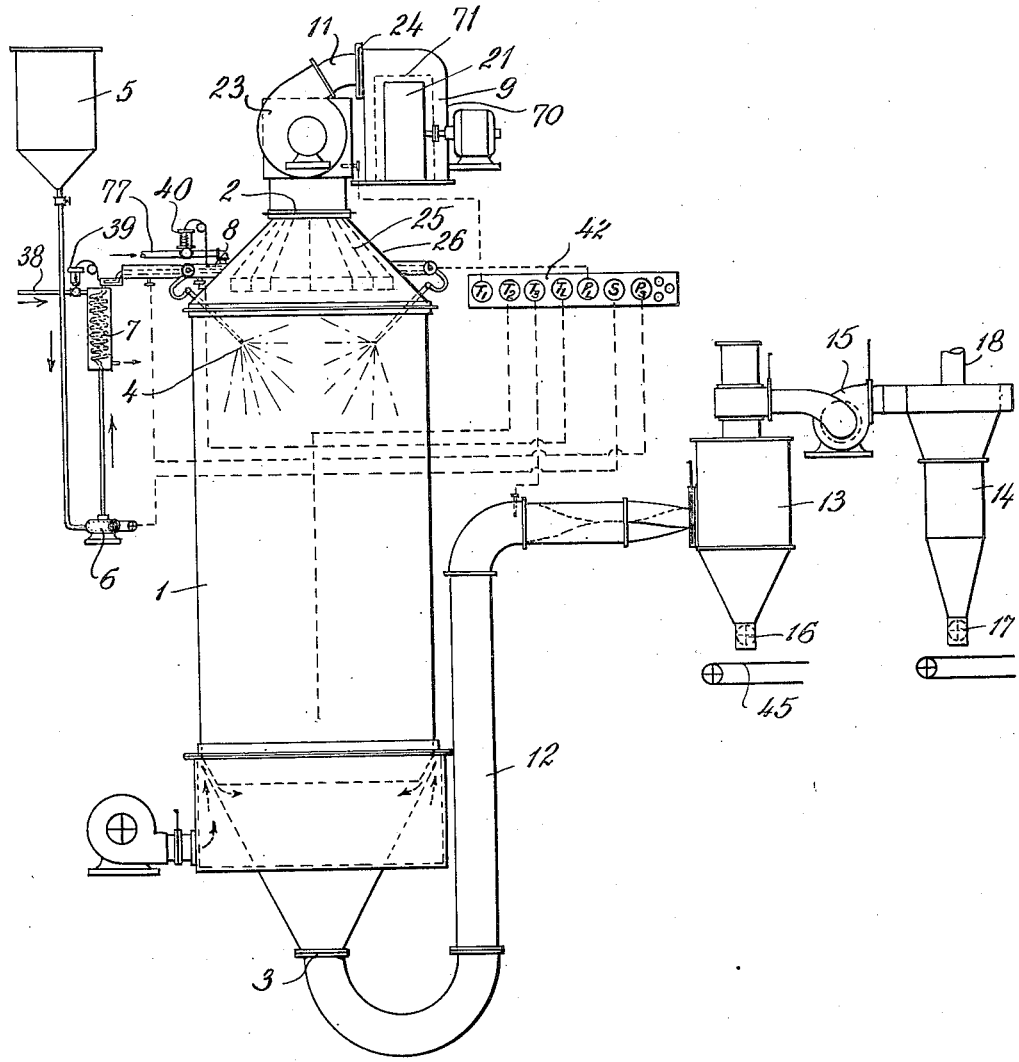

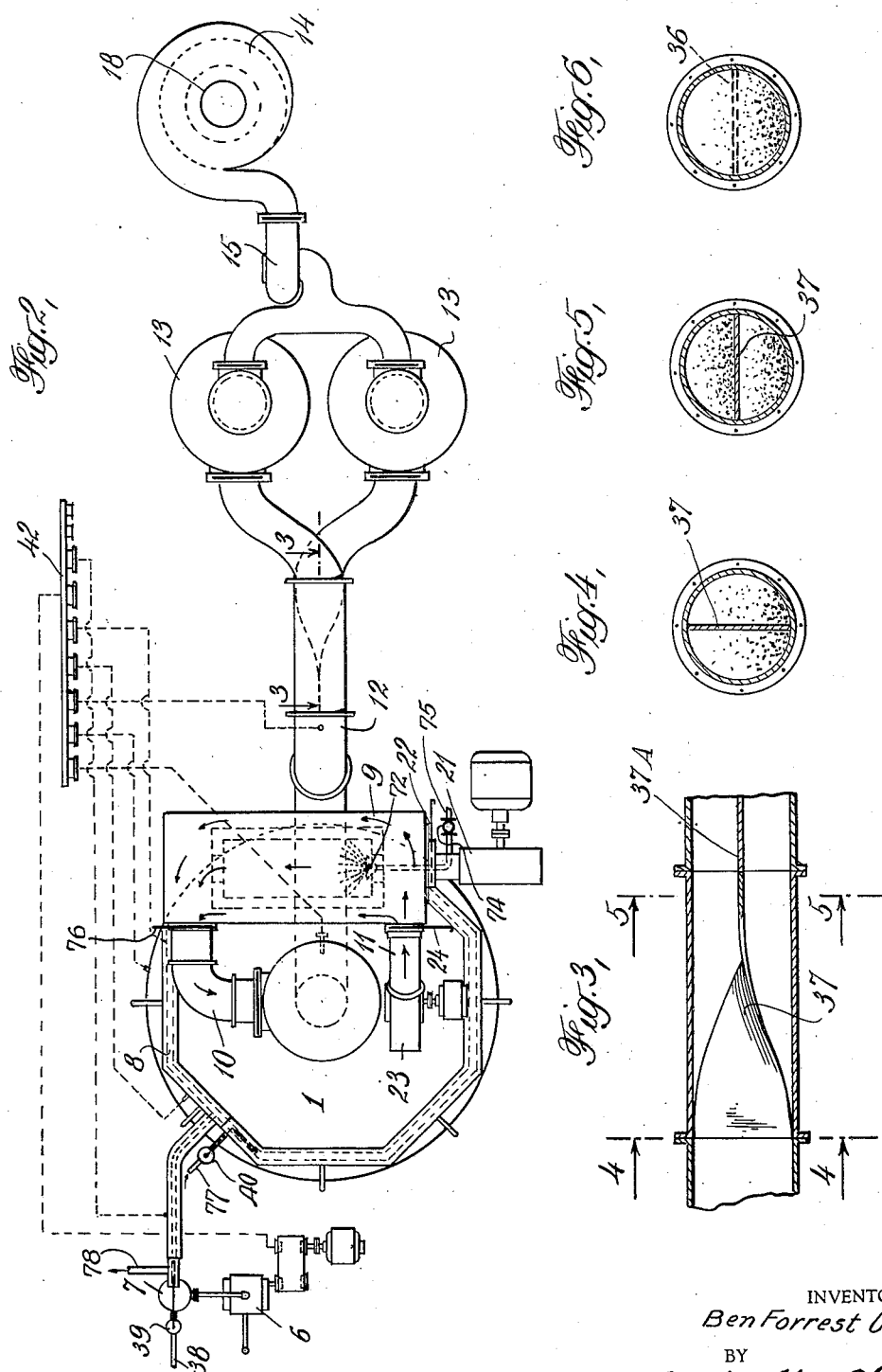

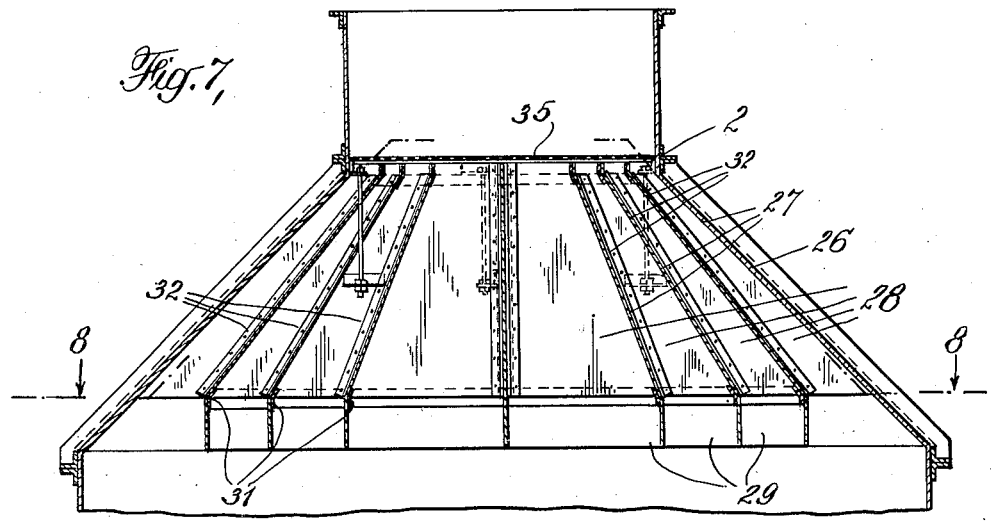
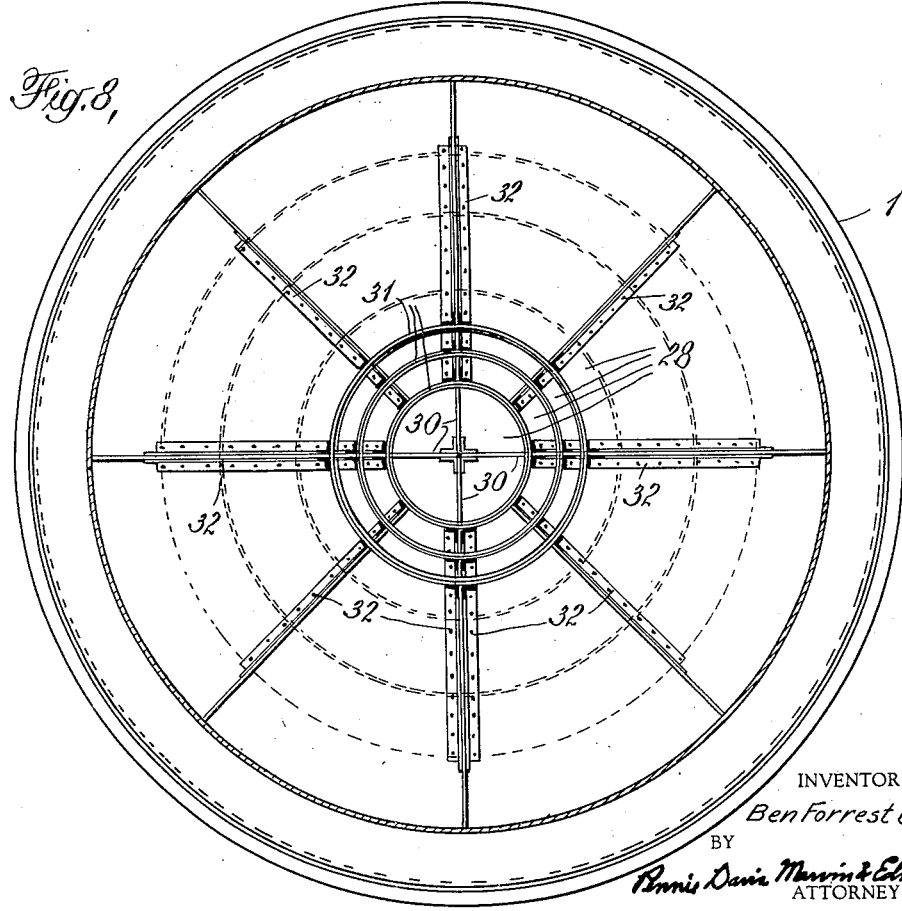

1,782,054

UNITED STATES PATENT OFFICE

BEN FORREST UHL, OF RICHMOND HILL, NEW YORK, N. Y., ASSIGNOR TO INDUSTRIAL SPRAY-DRYING CORPORATION, OF NEW YORK, N. Y., A CORPORATION OF DELAWARE

METHOD AND APPARATUS FOR PROCESSING MATERIALS BY MEANS OF GASES

Application filed September 1, 1927. Serial No. 216,809.

The present invention relates to a method and apparatus for the processing or drying of sprayed liquid materials, fluid substances or dispersed finely divided solid materials with gases, and the recovery of the treated material in the form of a dry or semi-dry powder or other finely divided particle solid form, and has to do with the treating chamber itself, the means for supplying the material and the treating gas to the chamber, and the means for collecting and storing the resulting processed product.

It has been found to be possible and desirable to control and vary the physical characteristics within practical operating limits, of the resultant product obtained by spray processing or drying a liquid material and/or gas treating a substance in finely divided particle form while finely dispersed and entrained or suspended in the treating gas, by an appropriate control and variation of the process and apparatus operating conditions. For example, it has been found possible in certain products to control and vary all or at least more than one of such characteristics of the resulting product such as particle size, particle shape, bulking weight, solubility characteristics, moisture content, etc., by appropriately controlling and varying such of the operating conditions as the treating gas temperatures, gas volumes, liquid material or finely divided substance temperature and the spray pressure or velocity and character of dispersion, etc. To satisfactorily effect such a predetermined control over the resulting product the material to be treated, the treating gas and the resultant product itself must be under control, and the process variables, viz, material temperature, the temperatures, pressures and volumes of the treating gas, etc., must be susceptible to quick, positive, complete and variable but definite control. It is a principal purpose of this invention to provide an apparatus which makes possible the control of the process and apparatus operating conditions as above indicated to enable a corresponding control of the properties of the resultant product itself, to render the product easily handled, and to produce a uniform and satisfactory product of desired physical characteristics within reasonable limits. The invention has to do principally with control of the amount and initial temperature of the treating gas passed into the treating chamber, distribution and control of the flow of treating gas into the chamber, control of the temperature, pressure and amount of liquid or other fluid material passed to the treating chamber, control of the temperature to which the resulting treated product is subject without affecting the amount or initial temperature of the treating gas entering the chamber, and the collection of the processed product in a plurality of collecting units in a way which insures no great variation in characteristics of the product collected in like units, which equalizes such inequalities as may occur and which effects a certain grading of the product by collection in units of different collection properties.

The accompanying drawings illustrate a preferred embodiment of the invention and will be of assistance in further describing the invention. In the said drawings Figure 1 is a general outline view in elevation of a complete apparatus embodying the present invention; Figure 2 is a plan view of the apparatus shown in Figure 1; Figures 3 to 6 inclusive, are detail views illustrating apparatus for delivering the treated product to a plurality of collectors in equal amounts of like quality; Figure 7 is a partial vertical sectional view through a portion of the apparatus showing the construction of the distributing and rectifying means which controls the incoming gas during its passage into the spray drying tower; Figure 8 is a plan view further illustrating the construction of this distributing and rectifying means; Figure 9 is a diagrammatic view showing a type of belt delivering and conveying arrangement which may be employed in receiving the treated product from the collectors, mixing the product from the several collectors and delivering the product to storage; and Figures 10 and 11 illustrate mechanism for delivering the treated product to storage bins and insuring substantially uniform quality of product delivered to and deposited in the several bins.

The described specific embodiment of the invention involves the spray processing of a liquid material in a heated gas, but the invention also contemplates certain modified embodiments, as, for instance, the use of unheated or cooled treating gas, the treatment of dispersed finely divided solid material, and the like. The processing apparatus here shown is more particularly adapted for carrying out a process wherein the sprayed or dispersed material and the treating gas pass in concurrent flow through the drying chamber. The invention is particularly applicable to this type of spray process, but certain features of the invention are applicable as well to other types of processes for gas treating dispersed substances. Referring particularly to Figures 1 and 2, the chamber in which the liquid or fluid material is treated is here shown as a vertical cylindrical tower 1 having an inlet opening 2 at its upper end for the admission of treating gas and an oulet 3 at its lower end for the discharge of the treated material and the spent treating gas. The liquid material under treatment is sprayed into the upper portion of the tower 1 by means of suitable spray nozzles 4. The liquid is, for example, drawn from the liquid storage reservoir 5 by means of pump 6, from whence it is passed through the liquid heater 7 and delivered through jacketed line 8 to nozzles 4 at an appropriate pressure. The apparatus here shown is particularly intended for a treatment of liquid materials which involves evaporating the major portion of the water or other volatile content of the material, and the heat energy for effecting such evaporation is supplied directly by the gas or oil burning furnace 9. The hot products of combustion from the furnace 9 pass through duct 10 into the upper end of the tower 1. A further source of treating gas as, for instance, atmospheric air may be mingled with the products of combustion by supplying it through duct 11 which, after circulating around the outside of the combustion chamber of the furnace 9 as shown, joins with duct 10 as shown, so that the gases delivered through both ducts 10 and 11 are passed together into the tower 1 through inlet opening 2. Upon entering the tower 1, the incoming treating gas comes into direct contact with the sprays of liquid material issuing from nozzles 4. The treating gas passes through the tower 1 in continuous flow, and the drops or particles of the sprayed material under treatment are entrained in the treating gas and are positively propelled by the gas current down along the length of the tower 1 while the treatment of the material is taking place. The entire contents of the drying tower 1, including the current of spent drying gas and the particles of treated material entrained in it, are discharged continuously through the outlet 3 at the bottom of the tower and are conveyed through duct 12 into the collectors. In the apparatus here shown, collectors 13 and 14 are connected in series, with the main fan 15 located between the two collectors, although the fan may be located at the extreme end of the system at 18. The collectors serve to separate the treated material from the current of spent treating gas, and the treated product is delivered from the lower ends of the collectors through the respective outlets 16 and 17. The spent treating gas passes out of the top of collector 13, through fan 15, into collector 14 and from thence out at the top of the collector through stack 18 to waste.

The initial temperature of the treating gas as it first comes into contact with the particles of the sprayed liquid may be important in its effect on the finished product, as for instance, in the matter of particle size, structure, shape, bulking weight, etc. Also, the total amount of heat contained in the gas admitted to the tower is usually important in its relation to the ultimate moisture content of the product, speed of drying, temperature attained upon completion of drying, etc. The present apparatus provides for complete and independent control of the total quantity of heat energy supplied to the drying tower, the amount of treating gas supplied, and the temperature at which the treating gas is supplied. Within the operating limits of the apparatus any desired quantity of heat may be furnished at any desired temperature. The heat generating unit is here shown as an oil burning furnace 9, but it is understood that any suitable source of heat may be provided such as a furnace burning gas, coal or other type of fuel, a furnace burning any desired kind of fuel and designed to heat a separate source of gas, as, for instance, air, with the actual products of combustion being passed to waste, steam coils supplied with steam under appropriate temperature and pressure conditions, electrical resistance elements arranged in heat transferring relation with the incoming treating gas, or the like. The furnace 9, illustrated in the drawings, is composed of an outer casing or shell 70 and an inner combustion chamber 71. The dimensions of the combustion chamber 71 are smaller than those of the outer shell 70 so that there is provided a space for circulation about the combustion chamber of the cool air admitted through duct 11, thus any heat which passes through the walls of the combustion chamber is absorbed by the cool air and not lost. In the front wall of the combustion chamber 71 is an aperture into which is fitted the duct which carries the combustion air. This aperture also accommodates the fuel burner 72 which receives its fuel supply from the pipe line 75, a valve 74 is provided on this line so that the fuel supplied may be regulated and controlled at will. In the rear wall of the combustion chamber 71 is provided an aperture through which the products of combustion issue from the combustion chamber and mingle with the cool air. The air necessary for combustion of the fuel is supplied to the furnace by means of a fan or blower 21. All of the air admitted to the combustion chamber 71 enters by way of fan 21 so that the amount of the combustion air is under definite control and may be definitely determined. The speed of the motor driven fan 21 may be varied to thus vary the amount of air supplied. Also, a damper 22 is provided at the discharge side of the fan so that accurate regulation of the amount of combustion air can be effected throughout the entire capacity range of the fan and furnace. In operation, the amount of fuel supplied to the furnace is regulated to such value that its combustion will produce such quantity of heat as is appropriate for the treatment desired to be effected in the tower. The fan 21 and the damper 22 are then adjusted to supply to the furnace exactly the correct amount of air for proper combustion, without regard to the temperature of the gases of combustion leaving the furnace. Thus it is possible to generate in the furnace any desired total quantity of heat within the operating limits of the apparatus and at the same time to establish the best conditions for proper and smokeless combustion irrespective of the amount of heat generated.

When the best conditions for proper heat generation are established in the furnace, the temperature of the gases of combustion leaving the furnace is higher than that ordinarily desired in the treatment of most materials. For the purpose of obtaining the desired temperature, a cooler gas as, for instance, atmospheric air, is mingled with the gases of combustion by means of fan 23 which positively delivers air through duct 11 into the stream of hot combustion gases coming from the combustion chamber. This fan 23 is driven by a motor whose speed can be controlled, and a damper 24 is placed in the line 11 at the discharge side of the fan so that the amount of cooling air mingling with the gases of combustion is under definite control. The fan 23 and damper 24 may be regulated so that when the desired amount of heat is being generated in the furnace the treating gases entering the main tower through the inlet opening 2 are at the desired temperature. There is no uncontrolled admission of gases to the tower for the reason that all of the gases entering the top of the tower must pass through either fan 21 or fan 23, at which points the gases are controlled as to amount. With this arrangement any desired quantity of heat can be furnished to the tower 1, and it can be furnished at any desired initial gas temperature. The furnace is adjusted to burn the amount of fuel which gives the proper quantity of heat for the desired treatment and that quantity of heat is supplied to the tower at any initial gas temperature by regulating fan 23 and damper 24. This feature gives the apparatus a flexibility of operation, insures positive control of important process variables and gives a convenient, quickly responsive control method for commercial operation.

To have the physical properties of the treated product under control, to produce a uniform product, and to effect a proper utilization of the heat energy of the treating gas, it is important that the gas traversing the treating chamber should be distributed properly across the section of the chamber and should proceed along the length of the chamber in orderly flow free from any substantial whirling or eddying or confusion of flow. Each drop of liquid emanating from the spray nozzles should be entrained by the treating gas, carried along in concurrent flow with the gas and positively propelled through and out of the treating chamber in controlled flow so that each particle is subjected to substantially the same length and kind of treatment as is every other particle. An apparatus for effecting a certain rectification and distribution of the incoming gas is shown in the U. S. patent to Walter H. Dickerson, No. 1,648,937. The present invention, in so far as it relates to the rectification and distribution of the incoming gas, is, in a sense, an improvement on and further development of the apparatus of the above mentioned patent, particularly in the respect of making the rectifying and distributing action more positive and effective. The present apparatus exerts a positive control over the movement of the incoming gas during its expansion from the diameter of the delivery duct to the full section of the tower. The treating gas enters the tower 1 through inlet opening 2 at the upper end of the tower and is expanded into the full section of the tower and distributed across the tower by means of the rectifying and distributing element indicated at 25 in Figures 1 and 2 and shown in detail in Figures 7 and 8. The rectifying and distributing element 25 is located in the top of the tower 1 directly below the gas inlet 2, and is hence within the cone shaped top 26 of the tower 1 which widens out from the gas inlet 2 to the full section of the tower 1. The element 25 consists essentialy of a nest of baffles or partitions 27 in the form of frustums of right cones arranged coaxially with their axes on the central vertical axis of the tower 1, as best shown in Figures 7 and 8. Three such concentric cone sections are here shown, and these cone sections or baffles, together with the top cone portion 26 of the tower, create four independent gas passages 28 which serve to conduct gas from the delivery inlet 2 to the full section of the tower. Viewed in horizontal section, as in Figure 8, the center gas passage 28 is circular in cross section while the other three gas passages are of annular concentric conformation. At any horizontal section the areas of the respective gas passages 28 are substantially equal. The ends of the passages adjacent the gas inlet opening 2 are equal and thus, with uniform distribution of the incoming air across the inlet opening, the respective passages 28 receive at their upper ends substantially equal amounts of air. Each of the respective gas passages 28 expands downwardly so that at their lower ends the passages are of equal discharge area covering all together substantially the full section of the tower. For the purpose of affording clearance for the nozzles, for permitting sight openings into the tower, etc., it may be desired to not extend the passages 28 the full lengh of the top cone portion 26 of the tower, and a reasonably satisfactory distribution is effected when the distributor elements 25 with its passages 28 falls somewhat short of the full section of the tower, as shown. The provision of the concentric cylindrical baffles 29 at the discharge ends of passages 28 for the purpose of deflecting the gas streams downwardly into parallelism with the tower walls assists in instituting a straight orderly downflow of gas through the tower. With the distributor 25 in place, the incoming gas entering the inlet 2 is divided into a plurality of separate paths, and the respective gas streams are positively directed across the tower 1 and are gradually expanded at equal rates into the full section of the tower, thus giving a notably uniform distribution of treating gas which tends to produce an orderly downflow of gas across the full section of the tower without coring or otherwise being subject to irregularities of distribution and flow.

The construction of the distributing element 25, as shown in Figures 7 and 8, involves the provision of a frame member which consists of vertically positioned diaphragms 30 interseting at right angles at the central vertical axis of the element, as shown. Top and bottom rings 31 are attached to frame members 30 to define the respective gas passages 28. Additional stay members 32 are provided for each of the concentric cone sections (see Figure 7) and are placed at appropriate intervals around the periphery of the respective sections (see Figure 8). Sheet metal sectors are fitted between the diaphragm frame members 30 and are supported by the various frame members and stays to thus form the coaxial conical baffles which constitute the gas passages 28. The intersecting vertically positioned diaphragm members 30 are provided to restrict whirling of the air as it enters the tower 1. These baffles extend up into the respective passages 28 in planes which contain the vertical axis line of the tower, as shown. Thus the tendency of the incoming air to whirl about the vertical axis of the tower is checked, and the gas passes down through the respective expanding passages 28 in an orderly substantially straight line flow which is deflected into a vertical direction by baffles 29 and continues along down through the tower. When the treating gas issues into the full section of the tower from the lower end of the element 25 it is flowing substantially in straight lines parallel to the tower axis, is free from substantial whirling, is distributed across the full section of the tower due to the positive directing action of the passages 28, and is substantially free from eddying, back-rolling and mushrooming due to the fact that the gas is distributed across the full tower section and is expanded gradually to that full section without abrupt changes in cross section of its path of flow. The element 25 with its expanding passages 28 constitutes essentially a group of gas receiving and conveying passages which receive all of the air from the inlet 2 and conduct such air in separate streams to specified areas across the full tower section to thus distribute the treating gas in a predetermined fashion, usually uniformly, across the full section of the tower. The plurality of gas passages 28 are all expanding in the same ratio so that the ratio of the areas of the passages is the same at the inlet end of the element 25 as at the discharge end. The cross sectional area of the various passages need not necessarily be equal. For instance, certain flow characteristics other than uniform distribution across the tower may be obtained by the provision of unequal areas or by expanding the passages in different ratios, but uniform distribution is the type of gas distribution ordinarily desirable. Furthermore, if the distribution of incoming gas across the inlet 2 is not uniform it may be desirable to make the areas of the passages 28 unequal at, say the upper end, to assist in getting a uniformity of distribution of air across the tower at the lower end of the element. To assist in getting a uniform air distribution across the inlet opening 2 a perforated distributor plate 35 may be laid horizontally across the inlet openings of the passages 28, as shown in Figure 7.

The finished treated product of the process is discharged from the treating chamber in suspension in the spent treating gas. Collection of the product from the spent gas is usually accomplished by centrifugal or so-called "cyclone" collectors, wherein gas and entrained solids are passed into the collector and subjected to a whirling action which throws out the treated product and discharges it at the bottom of the collector while the cleaned gas is passed to waste. Frequently, due to the size of the collectors, convenience of location, conditions of operation, etc., it is desirable to collect in two or more collectors connected in parallel rather than in one large unit. When this is done, the stream of spent treating gas with its entrained treated product must be divided either before it is discharged from the tower or at some point before it reaches the collectors so that the divided streams may be passed to the several collectors. This is ordinarily done by dividing the discharge opening or lower portion of the tower into two or more sections and connecting a separate conveying duct to each section, or by withdrawing the entire contents of the tower in a single duct and dividing that duct at a convenient point or points into branches corresponding in number to the number of collectors employed in parallel connection. It has been found that this arrangement is open to a number of important objections. For example, the several collectors usually receive considerably different amounts of material, and the character of material from the several collectors often shows considerable variation. It has also been found that the first objection just noted, namely, the collection of different amounts of material in the respective collectors, arises due to the fact that at the point or points where the stream of gas and entrained product is divided there is not a uniform distribution of the treated product across the entire section of the air current so that, even though the air current be divided in equal parts, unequal amounts of material may enter the respective openings of the divided portion. A typical instance of this situation is the division of a duct horizontally. In a horizontal duct there is apt to be a greater proportion of the product in the lower half of the duct than in the upper half, as shown in Figure 6. Thus, if a dividing partition as indicated in dotted lines at 36 be placed horizontally across the duct, the collector which communicates with the lower half of the duct will receive considerably more material than the collector which communicates with the upper half of the duct. Unequal distribution of the treated product across the section of a duct or tower outlet may occur for various other reasons, such as, for instance, non-uniform distribution of the spray nozzles across the tower section, whirling and eddying action in the ducts, bends or turns in the ducts, etc. The second objection above noted, namely, the collection of product of somewhat different quality in the several collectors, arises for somewhat similar reasons in that the quality of the product may not be uniform across the stream of gas which carries it. For example, in commercial operation it is not practicable to produce every particle of the product of the same density. In a horizontal duct, as shown in Figure 6, the particles of greater density tend to settle to the bottom half of the duct, and thus the majority of the more dense particles will all pass to one collector with the result that the bulking weight of the product taken from the two collectors will vary. This greater density may, for instance, be due to the fact that some of the particles have a slightly different moisture content than others, and with this situation the product collected from the respective collectors will show a certain difference in moisture content. The present invention avoids these objections by locating the dividing partition in the stream of spent treating gas and entrained product independently of the location of the permanent dividing line or partition which forms the ducts or chambers that receive the material for conveyance to the respective collectors. This result is accomplished by providing an insert for the duct or chamber in the form of a curved surface, as shown in Figures 3 to 5. In these figures the application of this principle to the case of a horizontally divided duct, is shown. At any transverse section the unit 37, which is in the form of a surface generated by a straight line simultaneously moving in a straight line perpendicular to itself and rotating about that line as an axis, is a straight line of direction depending upon the point along the length of the unit at which the section is taken. The unit 37 is placed in the duct so that its section at one end is horizontal and coincides with the permanent horizontal dividing partition 37A, as shown in Figure 3. If the unit is of such length as to constitute a half turn as shown, its dividing line at its free end will be vertical and will thus divide the stream of product into two equal parts both with respect to quantity and with respect to density, etc. No matter what the distribution of the product in a conveying duct is, there is some bisecting line which can be drawn to divide the passing product into equal portions. This line will also ordinarily bisect the stream of product as to such characteristics as bulking weight, moisture content, and the like, for the reason that such characteristics largely determine the location of the particles of the product in the duct where non-uniform distribution as to physical characteristics occurs. To determine in any instance the proper location of the bisecting line, different lengths of the curved unit 37 may be made up for standard size ducts and a succession of these units tried experimentally until a proper division of product in the two collectors is secured. This arrangement is particularly effective in dividing the product stream into two parts. When division into more than two parts is attempted it is not always possible to effect a positioning of a unit which will deliver equal amounts to the different collectors or which, even if equal amounts are delivered, will secure freedom from inequalities of product at the several collectors. Furthermore, the mechanical difficulties of making multi-pass units of this type render its adoption impractical. If it is desired to employ more than two collectors in parallel the best practice is to divide the entire stream of material into two parts and then divide these streams again into two parts so that the numbers of collectors used will be in the geometric progression 1, 2, 4, and 8, etc.

In certain instances it may be desirable to not collect in the first collector all of the resultant product composed of portions of somewhat unlike physical characteristics, but rather to use collectors connected in series each of which is adapted to collect a portion having averagely the same physical characteristics, the series effecting collection of all of the different component portions. For example where the product, if collected in one collector contains some fine material, such material may be separated out by using a collector of such collecting properties or by adjusting the air velocity therethrough to such value that it will collect a portion of the product but will pass the fine material. This arrangement may be employed instead of screening and in certain instances can be used to accomplish what could not be effected by screening, as, for instance, with products of such nature that if screened a substantial proportion of the particles would be broken. One way of accomplishing this result is to employ in series two collectors of different collecting properties. In the apparatus here shown collector 13 is of the ordinary cylindrical type, while the second collector 14 is of an improved type. A further separating differential may be obtained by employing conditions of air velocity, and the like, through the first collector which are not as conducive to thorough collection as are the conditions in the second collector. This may be done either with similar collectors connected in series or with different types of collectors. When separation in collection is employed as just described, the first collector in the series normally yields the principal bulk of the product while the second collector collects fine material which can be sold as a different grade of product or returned for reprocessing. In employing direct products of combustion as all or a part of the treating gas, a certain amount of unburned carbon may be present in the treating gas as a very fine soot or smoke which, even when in quantities so small as to be not visible to the eye, may be disadvantageous if incorporated with the product. By using the series arrangement of collectors here shown, it is possible to collect the bulk of the product in the first collector without collecting any substantial amount of this dust or smoke and to recover the finer portions of the product together with some smoke dust in the second collector, the product from the second collector being somewhat dirty but frequently recoverable by reprocessing.

The combination of the supply fans and control dampers ahead of the tower, as above described, and the main fan at the end of the system has certain important advantages. It is conducive to proper and positively controllable flow conditions throughout the apparatus. It enables the whole system to be operated at substantially atmospheric pressure, and the pressure within the system is subjected to regulation within certain limits. It is frequently desirable to subject certain materials as, for instance, food products which are readily susceptible to injury by heat, to relatively high initial gas temperatures and quickly thereafter to much cooler gas temperatures to prevent injury to the product. It is usually not possible or feasible to effect such considerable and rapid reduction in temperature by the cooling action of evaporation alone, but rather is expedient to effect the necessary reduction in temperature by introducing cooling air to the treating chamber. With the supply fans and the main fan provided and arranged as here described, it is particularly easy to effect introduction of the proper amount of cooling air in rather accurately measured amount. For example, a fan for introducing the cooling air may be provided. The supply fans can be set to deliver to the tower a certain constant and appropriate amount of air. The amount of cooling air required can then be determined. The main fan at the end of the system can be set to withdraw an amount of air equal to that delivered by the supply fans plus that introduced by the cooling fan. The cooling fan can then be set to deliver the proper amount of cooling air and the whole system is in balance with a positive control over the air quantities at every point of admission and outlet. This advantage is also equally important where the cooling or additional air is employed for any purpose as, for instance, to create a moving air sheet down the inside of the discharge cone of the tower, to cool the inside tower walls, or to provide air sheets along the tower walls to restrict contact of the material under treatment with the walls, as disclosed in U. S. Patents Nos. 1,634,640 and 1,730,048 of Paul T. Zizinia. This arrangement of supply and main fans is also advantageous where no separate cooling air fan is used but where a pressure difference between inside and outside of the drying chamber is relied upon to draw in the additional air. With the arrangement of supply and exhaust fans here shown this pressure difference may be varied without changing the amount or temperature of the gas entering the drying chamber. For example, the main fan may be speeded up to thus lower the pressure within the drying chamber, but, inasmuch as the inflow of air is determined by operation of supply fans, the increased pressure difference between the inside and outside of the tower will result in a greater inrush of the cooling air through the openings provided for that purpose. Thus, with either a separate cooling fan or none, the gas supply and discharge through the respective channels is under positive control, and any desired quantity of gas at any desired temperature (and any desired heat quantity) can be introduced to effect any desired amount of evaporating or other treatment and to give any desired final temperature in the tower. It is such features of flexibility and control that make possible control of the resultant product characteristics.

It is important that the liquid to be treated be supplied to the spray nozzles in proper condition. The degree of preheating of the liquid is frequently of particular importance. The preheating of the liquid is conducted in the heater 7, and the proper temperature of the liquid issuing from the heater is assured by means of an automatic thermostatic control. The heating medium for the heater 7 is preferably steam admitted through line 38 into heat transferring relation with the liquid traversing the heater. The thermostatic control indicated at 39 serves to regulate the amount of heating steam admitted to the heater in such manner that a substantially constant liquid temperature is maintained at the discharge side of the heater. The liquid line 8 which conveys the heated liquid from the heater 7 to the spray nozzles 4 is built in the form of a ring encircling the upper end of the tower 1, as shown, and provided at appropriate intervals with connections to which the spray nozzles 4 may be attached so that the nozzles are distributed around the tower. Any number of nozzles at any desired part of the tower may be used at any time. This line 8 from the liquid heater to the nozzles is steam jacketed, and the steam jacket is provided with a steam inlet 77 and a steam outlet 78. It is important that the temperature of the liquid material delivered to the respective nozzles be at the proper value and be the same at all nozzles. For instance, if the liquid were not heated on its way between the heater and the nozzles it would cool down somewhat before reaching the first nozzle and would be still cooler at succeeding nozzles spaced around the tower. On the other hand, if heating steam were supplied to jacketed line 8 in too large quantity or at too high a temperature, the liquid temperature at the nozzles would be greater than the temperature at the discharge side of the heater and the temperature at successive nozzles around the tower would be increasingly greater. The present apparatus insures the same liquid temperature at all nozzles and insures the same temperature at the nozzles as at the discharge side of the heater. This is accomplished by supplying to the jacketed line 8 as heating medium steam at such pressure that its condensation temperature is equal to the liquid temperature desired at the nozzles. The heating steam is admitted to the steam inlet 77 of the steam jacket of the line 8 through the pressure control valve 40 which functions to maintain the desired steam pressure. The steam is admitted in ample quantity to insure the presence of uncondensed steam throughout the steam space in the jacketed line 8, thus insuring proper temperature conditions. The liquid pump 6 is provided with a speed control S located on the instrument board 42 which carries the various temperature and pressure recording instruments. The pressure gage $P_L$ in the liquid line 8 indicates the liquid pressure at the nozzles. In the usual operation the operator reads the gage $P_L$ at intervals and holds a substantially constant liquid pressure by regulating the pump speed through the medium of the control S. This pressure may, if desired, be automatically regulated, but such an automatic control is not ordinarily required for the reason that once the proper pump speed and liquid pressure have been established no sudden or substantial variations in pressure will occur unless some accident or unusual conditions arise in the system. Normally, with the liquid temperature and pressure at the nozzles constant, the quantity of liquid delivered to the tower will be constant. If it is desired to keep a check on the liquid quantity delivered to the tower, other than the check which is obtained by keeping a record of the amount of treated product produced, a recording flow meter may be provided in the liquid line to give readings both of the total amount of liquid delivered to the tower and of the rate of delivery of liquid to the tower at any time.

It is particularly important that the quality of the resultant product delivered from the respective collectors be uniform. In packaged goods sold to the retail trade, for instance, even a small variation in the weight of the product as delivered to the packaging machines is prohibitive. The cartons or containers of given volume must contain a given weight of the product and they must be filled to a close tolerance. If the product as delivered to the carton filling machines runs appreciably light the required weight of the product more than fills the carton and the product cannot be used; if the product runs appreciably heavy the carton is not sufficiently full and is not a salable article. The provisions above described for delivering uniform quality product to the respective collectors is effective in eliminating this difficulty, but where the difference in quality is not sufficiently important to warrant the installation of such an equalizing device, where it is difficult or otherwise not feasible to install such a device, or where such device does not give a sufficiently uniform product from all collectors, a further means of giving quality uniformity to the product as delivered to the filling machines is contemplated by this invention. In the arrangement shown in Figure 1, the two collectors 13 normally collect the bulk of the product. Referring to the diagrammatic showing of Figure 9, one of the collectors discharges onto an endless belt 45. The other collector 13 discharges onto a second belt 45A. Belts 45 and 45A discharge upon belt 46, so that the material from both collectors is laid upon belt 46. If desired, leveling devices 47 and 48 may be provided as shown to level off the material discharged from the respective belts 45 and 45A and distribute it across the width of belt 46. In operation the material discharged onto belt 46 by belt 45 is spread out and leveled by the distributor or leveling device 47. Belt 45A then discharges the product from the other collector on top of the leveled and distributed material riding on belt 46, and this second layer of product is distributed and leveled by the leveling device 48. Thus, the product from each collector is distributed out on the belt as a uniform layer and the second layer of product is laid directly upon the first layer so that the discharge from belt 46 represents a uniformly proportioned composite product from the two collectors. Belt 46 discharges directly to the storage bins, and the bins receive a composite stream of product from both collectors with the result that any small inequalities in weight, etc., of the product from the respective collectors is equalized.

It is usually desirable in packing the product to have a plurality of storage reservoirs or bins for supplying separate filling machines. In Figure 9 a system involving three bins is shown. A divider 50 is positioned above the main product conveying belt 46, as shown, and scrapes off into the first bin 51 substantially one third of the product passing on the belt. The remainder of the product passes on to the dividers 52A and 53A which similarly supply bins 52 and 53. Thus the product delivered to each bin is a composite product containing product from all of the respective collectors. If it is desired to discontinue filling bin 51, for instance, divider 50 may be lifted to permit all of the product to pass to bins 52 and 53. If it is desired to discontinue the supply of product to any bin or if it is desired to vary the proportions of product delivered to the respective bins, the dividers may be appropriately adjusted widthwise of the belt 46 so that they scrape off a greater or lesser proportion of the product. This same principle may be applied to any number of bins.

Figure 11 illustrates a modified arrangement for delivering uniform quality product to several bins, two being shown. The bins are indicated at 51 and 52. The main delivery belt 46 terminates over bin 51. A short belt 55 cooperates with belt 46 to receive the discharge therefrom, and this belt extends to bin 52. Similar short belts communicate with the remaining bins, not shown. Belt 46 travels continuously in the direction indicated by the arrow. Belt 55, and other similar belts 56, if more than two bins are used, are driven by separate motors and each belt may be rotated in either direction or stopped entirely at will without affecting the operation of the other belts. When it is desired to fill bin 51, belt 55 is reversely rotated, as indicated by the dotted arrow, so that product from belt 46 falls upon belt 55 where its direction of travel is reversed and the product then drops off the end of the belt 55 into bin 51. To fill bin 52, belt 55 is rotated in a forward direction and belt 56 in a reverse direction. Any desired one of the bins may be supplied as desired, the bins being supplied with product successively. The control board 58 contains the necessary switches to effect operation of the various belts as desired. For automatic operation a contact bearing element or commutator may be provided to successively set the various belts in operation in such manner that each bin will be supplied with product over a predetermined length of time, after which the product will be diverted to the next successive bin. With this arrangement, the apparatus is entirely automatic in operation, it being merely necessary for the operator to observe at intervals the height to which the several bins are filled. In case certain bins become more full than others the automatic operation may be cut off and the manual control used to equalize the contents of the bins.

For the purpose of depositing the representative composite product taken from main conveyor 46 in the storage bin without substantial separation of the product into portions of differing physical characteristics, the arrangement shown diagrammatically in Figure 10 may be employed. The uniform run of product from the conveyor is delivered to hopper 60, which in turn delivers to the discharge spout 61 which is mounted and driven as shown so that it rotates about the vertical axis of the storage bin and is also movable along the height of the bin. Thus the discharge spout travels over a considerable area across the section of the bin and moves upwardly or downwardly depending upon how full the bin is. With this arrangement the product entering the bin is laid upon the surface of the product which is already in the bin and is distributed over the greater part of the section of the bin, so that separating of the product into portions of different characteristics which takes place when, for instance, the product is spilled into the bin from a considerable height, is avoided.

The invention, therefore, contemplates the various novel features of spray processing apparatus and operation above described, all of which are of value in systematizing the operation, putting all of the variables under positive control, and in general making possible scientific and accurate treatment of materials and successful handling of materials heretofore regarded as impossible of such treatment, particularly in large commercial installations capable of large quantity production.

I claim:

1. In a spray processing apparatus the combination with a treating chamber wherein a flow of treating gas in one general direction is maintained, of means for continuously delivering a current of treating gas to said chamber, and means comprising a plurality of gas conducting passages of substantial length and substantially free from abrupt changes in direction or in cross sectional area for receiving the incoming treating gas, conducting said gas in a plurality of separate streams to specified discharge areas arranged across a section of the treating chamber substantially transversely to the general direction of flow through said chamber, which areas combined are substantially larger than the cross sectional area of the incoming gas current at the point where it is divided into said plurality of streams, and discharging said plurality of gas streams substantially transversely of said respective discharge areas, whereby a positive distribution of the said gas is effected across the treating chamber and a flow of said gas having no substantial component at right angles to the general direction of flow through the chamber is obtained.

2. Apparatus for the treatment of materials with gases which comprises a treating chamber, means for continuously distributing the material to be treated within said chamber in dispersed condition, means for delivering a continuous current of treating gas to said chamber, and a plurality of gas conducting passages of substantial length whose inlet areas cover the entire cross section of the incoming unexpanded gas current, which passages expand similarly and without abrupt substantial changes in section from their inlet to their discharge ends and which have respective discharge areas in substantially the same ratio as their inlet areas.

3. Apparatus for processing finely divided materials which comprises a treating chamber, means for passing a continuous supply of material to be processed into said chamber, means for dispersing said material in finely divided condition within said chamber, means for delivering a current of treating gas to said chamber, and a plurality of expanding gas conducting passages for controlling the flow of gas into the drying chamber which have equal inlet areas extending over the entire cross section of the incoming gas current before substantial expansion of the cross section area thereof, whereby substantially equal amounts of gas are received and carried by said respective passages, and which have equal discharge areas extending over substantially the entire section of the treating chamber, whereby the distribution of the gas discharged from said passages into the full section of said treating chamber is substantially similar to the distribution of the gas entering said passages, and means acting on the incoming gas current ahead of the inlet ends of said passages for promoting uniform distribution of the gas entering said passages to thereby effect substantially uniform distribution of the gas across the chamber section at the discharge ends of said passages.

4. Apparatus for processing finely divided materials which comprises a treating chamber, means for continuously introducing said material in dispersed form into said chamber, an inlet for admitting treating gas to said chamber, a transformation portion provided on said treating chamber for connecting the said gas inlet with substantially the full section of the drying chamber, and a nest of baffles of the same general shape as said transformation portion arranged coaxially within the said portion and forming a plurality of gas passages for receiving the treating gas entering through said gas inlet and conducting said gas along into the drying chamber in several independent streams expanding in conformity with the said transformation portion without abrupt substantial changes in gas conducting section and directed to effect positive substantially uniform distribution of the treating gas across the treating chamber.

5. Processing apparatus of the general class described which comprises a treating chamber, means for supplying material to be processed to said chamber, means for reducing said material to finely divided and dispersed condition within said chamber, inlet means for admitting a current of treating gas to said chamber, a plurality of uniformly expanding gas conducting passages for receiving all of the treating gas entering through said inlet means before any substantial expansion of the cross section area of flow of the said incoming current of treating gas has been permitted and conducting the said gas into the main portion of the treating chamber in a plurality of separate streams discharging at specified areas across the said chamber, and means provided in each of said several gas conducting passages for restricting whirling of the incoming gas about the central axis of the treating chamber, whereby the gas issuing into the full section of the drying chamber proceeds in straight orderly flow throughout the entire section of the chamber without substantially whirling or eddying.

6. A gas distributing and rectifying element for the gas inlet end of a processing chamber for gas treating a substance in finely divided particle form while finely dispersed and suspended in the gas which comprises a nest of coaxially disposed baffle members forming a plurality of concentric gas passages expanding substantially uniformly from the gas inlet to substantially the full section of the treating chamber to thereby supply gas to the chamber in substantially uniform distribution and free from eddying and backrolling, and having in each passage additional baffles mounted in planes which contain the axis of the said nest of coaxial baffles to thereby substantially eliminate whirling of the gas as discharged from said passages.

7. Apparatus for processing materials by means of directly applied hot gases which comprises a treating chamber, a combustion furnace, means for continuously supplying fuel to said furnace, means for controlling the amount of fuel supplied to said furnace, a fan for continuously supplying combustion supporting gas to said furnace, means for controlling the amount of gas supplied to the furnace by said fan, whereby the best combustion conditions may be obtained for any desired rate of fuel consumption, a fan for continuously introducing cooler gas to the hot gases of combustion leaving said furnace, means for controlling the amount of said cooler gas handled by said fan and mingled with the hot gases of combustion, whereby any desired temperature of the intermixed gases may be obtained, means for passing said intermixed gases into the said treating chamber in continuous current, means for continuously introducing the material to be treated into said chamber in finely divided condition exposed to the action of said treating gas, a fan for maintaining the flow of treating gas and material under treatment through the treating chamber, and means for controlling the amount of gas handled by said fan.

8. Apparatus for the treatment of materials with gases which comprises a treating chamber, means for continuously introducing material to be treated into said chamber in finely divided condition, means for heating treating gas for introduction into said chamber, a fan for passing a continuous current of said heated treating gas into said chamber, substantially independently of the operation of the other parts of the apparatus, means for controlling the amount of heated gas delivered by said fan, a second fan for independently delivering to said treating chamber at a point substantially removed from the hot treating gas inlet cooler gas to effect a reduction in temperature in the said treating chamber, means for controlling the amount of cooler gas delivered by said fan, whereby any desired quantity of heat may be supplied to said treating chamber at any desired gas temperature to effect any desired amount of treating and evaporating action with a final temperature in the treating chamber as low as desired within practical operating limits, and separate positively acting gas propelling means for maintaining the flow of treating gas and dispersed product through the treating chamber.

9. Material processing apparatus of the general class described which comprises a treating chamber, means for continuously introducing materials to be processed into said chamber in finely divided condition, means for heating treating gas for introduction into said chamber, a fan for passing a continuous current of said heated treating gas into said chamber, substantially independently of the operation of the other parts of the apparatus, means for controlling the amount of treating gas delivered by said fan so that any desired quantity at any desired gas temperature may be supplied to the treating chamber, a fan for positively withdrawing from said heating chamber a current of spent gas, means for controlling the amount of gas handled by said fan, inlet means for admitting additional gas to said treating chamber at a point other than the principal inlet for heated treating gas, said treating chamber and other gas conducting parts of the apparatus being substantially gas tight to thereby prevent substantial admission or discharge of gas at points other than the intended points of admission and outlet, whereby the amount of said additional gas may be controlled by controlling the difference in the amounts of gas handled by the discharge and the inlet fans.

10. Apparatus for processing materials by means of gases which comprises a treating chamber, means for continuously supplying to said chamber a current of treating gas, means for continuously introducing the material to be treated into said chamber in finely divided and dispersed condition, means for continuously withdrawing treated material and spent treating gas from said chamber in intermixed condition, means for dividing the total flow of spent treating gas and treated material into a plurality of streams all substantially identical in amount of gas handled, amount of treated material carried and character of treated material, and a plurality of collectors in parallel connection for receiving respectively the said several streams of intermixed gases and treated material and collecting the said treated material, whereby all of the collectors deliver substantially the same amount of material of substantially identical character.

11. Apparatus for processing materials by means of gases which comprises a treating chamber, means for supplying a current of treating gas to said chamber, means for distributing the material to be treated in finely divided condition to the action of said gas in the treating chamber, means for effecting a continuous discharge flow of spent treating gas and treated material from said drying chamber, fixed means for dividing the stream of spent treating gas and treated material into two independent streams, two collectors in parallel connection for receiving the respective divided streams of spent gas and treated material and a helicoidal baffle unit of straight line transverse section located at the said division point of the flowing material having one end coincident with the said permanent dividing means and being of such conformation that its other end section substantially bisects the stream of gas and entrained treated material to thereby pass into the said respective collectors separate streams substantially identical in amount of gas handled and amount and character of treated material delivered.

12. Apparatus for processing materials by means of gases which comprises a treating chamber, means for introducing material to be treated into said chamber in finely divided condition, means for passing a current of treating gas through said treating chamber into contact with said material and out of said chamber with the treated material entrained therein, and two centrifugal collectors in series connection for receiving the gas and entrained treated material discharged from said treating chamber, said collectors having different collection properties such that material of a certain predetermined average character is collected in the first collector and the material of averagely different character is collected in the second collector, whereby a definitely graded product of the treated material is delivered directly from the first collector.

13. Apparatus for processing materials by means of hot gases which comprises a treating chamber, means for introducing material to be treated into said chamber in finely divided condition, a combustion furnace for delivering products of combustion to said chamber as hot treating gas, means for establishing a continuous flow of treating gas and entrained material through and out of said treating chamber, a centrifugal collector for receiving the spent treating gas and the treated material substantially in suspension therein issuing from said chamber adapted to collect the major portion of the treated material and to discharge uncollected any smoke particles which may be present in the gases of combustion, and treated material of smoke particle size, and a second centrifugal collector in series connection with said first collector for receiving the spent gases and fine material discharged from said first collector and collecting therefrom substantially all of the remaining treated material and smoke particles.

14. Apparatus for processing materials by means of gases which comprises a treating chamber, means for introducing material to be treated into said chamber in finely divided condition, means for passing a current of treating gas through said treating chamber into contact with said material and out of said chamber with the treated material entrained therein, a plurality of collectors in parallel connection for receiving the spent gases and entrained treated material discharged from said chamber, and means for intermixing the material discharged from the respective collectors without substantial crushing of particles and with the material mixed in proper relative proportion to thus constitute a composite material which is a representative average of the material discharged from the several collectors, whereby material taken in the course of regular commercial operation is of uniform representative average character.

15. Apparatus for processing materials by means of gases which comprises a treating chamber, means for introducing material to be treated into said chamber in finely divided condition, means for passing a current of treating gas through said treating chamber into contact with said material and out of said chamber with treated product entrained therein, a plurality of collectors for receiving the spent treating gas and entrained treated product discharged from said chamber and collecting the treated product, product conveying means associated with said collectors, and means for continuously depositing on said conveying means the product discharged from the several collectors, whereby a cross section of the total amount of product carried on said conveying means is a representative composite product containing material from each of the several collectors.

16. Apparatus for processing materials by means of gases which comprises a treating chamber, means for introducing material to be treated into said chamber in finely divided condition, means for passing a current of treating gas through said treating chamber into contact with said material and out of said chamber with treated product entrained therein, a plurality of collectors in parallel connection for receiving the spent treating gas and entrained treated product discharged from said chamber and collecting the said product, product conveying means associated with said collectors, means for continuously depositing on said conveying means the product discharged from the respective collectors, whereby the continuous body of product carried on said conveying means is a representative composite product containing throughout its continuous extent product from each of the several collectors, and means for depositing said composite product in a receiving receptacle without substantial separation of the product into portions of different characteristics.

17. Apparatus for processing materials by means of gases which comprises a treating chamber, means for introducing the material to be treated into said chamber in finely divided condition, means for passing a current of treating gas through said treating chamber into contact with said material and out of said chamber with treated product entrained therein, a plurality of collectors for receiving the spent treating gas and entrained product discharged from said chamber and collecting product, product conveying means associated with said collectors, means for continuously depositing on said product conveying means the product discharged from the several collectors, whereby the product carried on said conveying means is a continuous body of representative composite product containing material from each of the several collectors, a storage receptacle, delivery means for supplying product to said storage receptacle, means for moving said delivery means about within said receptacle in both a lateral and vertical direction to thereby effect discharge of product from said delivery means at different points across the section of said storage receptacle and at different points along the height of said receptacle, and means for continuously supplying to said moving delivery means the said representative composite product from the said conveying means, whereby the product delivered to said storage receptacle is laid throughout the section of the receptacle upon the surface of the product already contained therein without opportunity for separation of portions of the product having somewhat differing characteristics.

18. Apparatus for processing materials by means of gases which comprises a treating chamber, means for introducing material to be treated into said chamber in finely divided condition, means for passing a current of treating gas through said treating chamber into contact with said material and out of said chamber with treated product entrained therein, a plurality of collectors for receiving the spent gas and entrained treated material discharged from said chamber and collecting the treated product, product conveying means associated with said collectors, means for continuously depositing on said conveying means the product discharged from the several collectors, whereby the product carried on said conveying means is a continuous body of representative composite product containing material from each of the several collectors, means for dividing the said body of continuously delivered representative product into portions each composed of composite representative product, and means for delivering the respective portions of the said representative product to a plurality of receiving receptacles, whereby each of said receptacles is supplied with product of representative, average and like characteristics.

19. Apparatus for processing materials by means of gases which comprises a treating chamber, means for introducing material to be treated into said chamber in finely divided condition, means for passing a current of treating gas through said chamber into contact with said material and out of said chamber with treated material entrained therein, a plurality of collectors for receiving the spent treating gas and entrained treated product discharged from said chamber and collecting said product, product conveying means associated with said collectors, means for successively depositing on said product conveying means the product discharged from the several collectors, means for leveling and distributing across said conveying means the product from each collector into the form of a layer of substantially uniform thickness extending across said conveying means before the product from another collector is deposited thereon, whereby the product from the several collectors lies on said conveying means substantially as super-imposed layers of uniform thickness extending across the conveying means, a succession of dividers for continuously removing from said conveying means a portion of the width of the body of composite product carried thereon, and means associated with said respective dividers for delivering material to different storage receptacles, whereby each storage receptacle is supplied with material of representative characteristics.

20. In a spray processing apparatus comprising a treating chamber and means for delivering treating gas to said treating chamber, a liquid supply system which comprises means for spraying into said chamber liquid material to be treated, a heater for heating said liquid prior to its introduction into the chamber and while it is flowing in a continuous current on its way to said chamber, a temperature control for automatically controlling the temperature of the liquid discharged from said heater to a desired substantially constant value, a steam jacketed liquid line between said heater and said treating chamber for delivering the liquid to said treating chamber at substantially the said desired temperature value, means for supplying heating steam to said line and pressure regulating means for controlling the pressure of said steam whereby the said steam may be controlled to such a pressure that the condensation temperature of said steam is substantially equal to the said desired temperature of the liquid discharged from said heater, the steam supply means being such that the said steam is furnished in ample quantity to insure presence of uncondensed steam in said line at all times.

21. The method of treating materials in finely divided condition by means of gases which comprises establishing a continuously flowing current of treating gas, dividing the said incoming unexpanded current of treating gas into a plurality of separate streams, independently but simultaneously and gradually expanding said several gas streams to larger cross sectional areas of flow, restricting the whirling motion of the gas in each of said expanding streams to effect a substantially straight flow of gas in each of the several streams, discharging said several expanded streams of treating gas into contiguous areas to form a combined resultant continuous current of treating gas of enlarged cross sectional area flowing in a straight, orderly manner without substantial whirling or confusion of flow, dispersing the material to be treated in finely divided condition across said resultant flowing current of treating gas without substantially altering the character of flow of said gas current whereby said material is carried along in finely divided form entrained in dispersed condition in said gas current, and then separating and collecting the material from the gas after a predetermined interval of treatment.

In testimony whereof I affix my signature.

BEN FORREST UHL.